C. H. & G. B. VAN WERT.
SHOCK ABSORBER.
APPLICATION FILED OCT. 4, 1913.
1,113,073.
Patented Oct. 6, 1914.
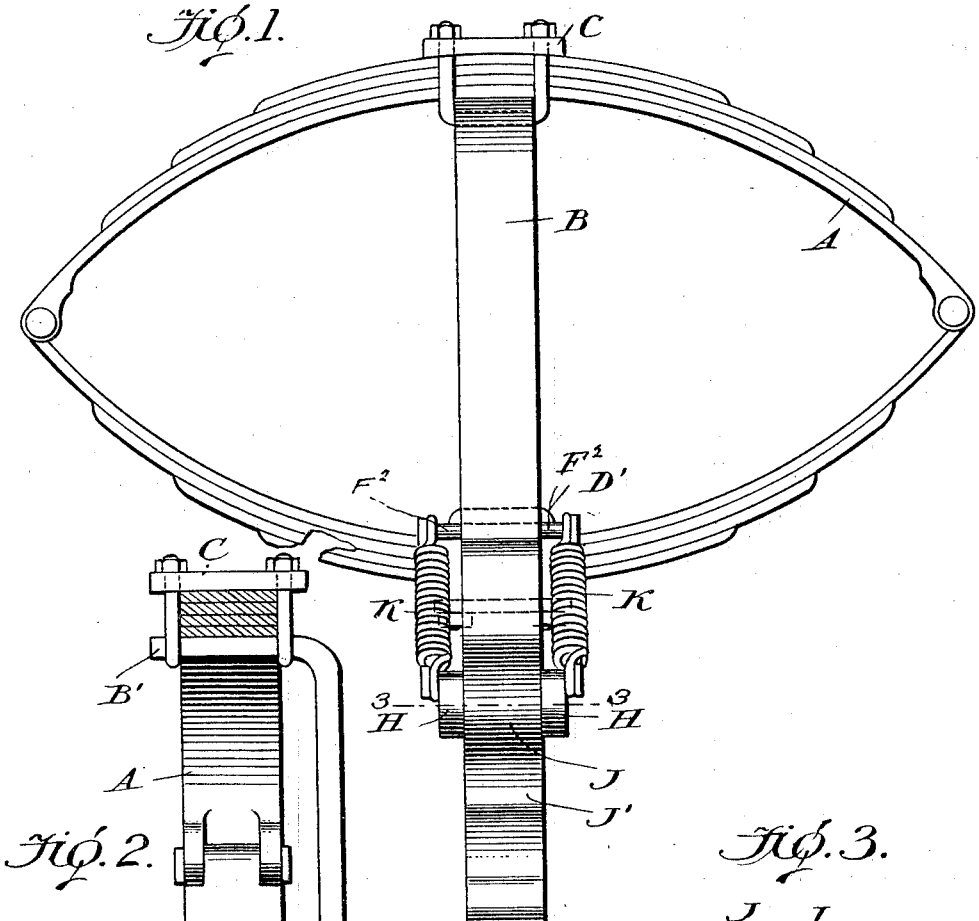
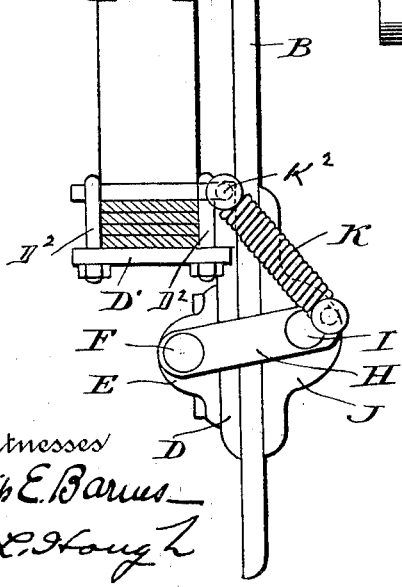
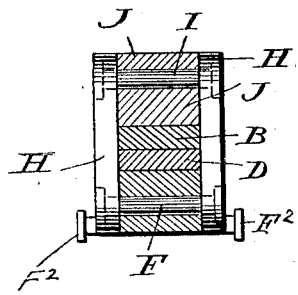
Inventors
C. H. Van Wert
G. B. Van Wert

UNITED STATES PATENT OFFICE.

CHARLES HOWARD VAN WERT AND GEORGE BASTON VAN WERT, OF KINGSTON, NEW YORK; SAID CHARLES H. VAN WERT ASSIGNOR TO WALTER H. VAN GAASBEEK, OF KINGSTON, NEW YORK.

SHOCK-ABSORBER.

1,113,073.  Specification of Letters Patent.  Patented Oct. 6, 1914.

Application filed October 4, 1913. Serial No. 793,498.

*To all whom it may concern:*

Be it known that we, CHARLES H. VAN WERT and GEORGE B. VAN WERT, citizens of the United States, residing at Kingston, in the county of Ulster and State of New York, have invented certain new and useful Improvements in Shock-Absorbers; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in shock absorbers for vehicles and the object in view is to produce a simple and efficient device of this nature which may be easily and quickly applied to ordinary springs upon vehicles and so arranged as to permit of the free unrestricted movement of the spring on the downward compression of the same, but serving to retard the return upward movement of the spring, thereby taking up vibration and preventing the springs breaking.

The invention comprises various details of construction and combinations and arrangements of parts which will be hereinafter fully described, shown in the accompanying drawings and then specifically defined in the appended claim.

Our invention is illustrated in the accompanying drawings, in which—

Figure 1 is a side elevation showing the application of our shock absorber to a pair of springs. Fig. 2 is a vertical sectional view through the springs showing in side elevation the shock absorber attached thereto. Fig. 3 is a sectional view on line 3—3 of Fig. 1.

Reference now being had to the details of the drawings by letter, A designates a pair of elliptical springs of the usual construction used on vehicles of various kinds, and B is a bar having its upper end B' bent at an angle and fastened to the upper spring by means of a clip C. An angle bar, designated by letter D, is held by the plate D' and the bolts $D^2$ to the spring, as shown clearly in Fig. 2 of the drawings, and journaled on the pins F carried by the bracket E are the lugs H which have pivotal connection through the medium of the pin I with the bracket J, and springs K are pivotally connected at one end to the pin $K^2$ upon the bar D and the other ends are connected to the headed lugs $F^2$ projecting from the lugs H. Said springs normally hold the two clamping members E and J respectively in contact with the outer faces of the two bars D and B and, on a downward movement of the bar B incident to the compression of the springs A, the two bracket members will move slightly from each other but, on the expansion of the springs A, the coiled springs K will tend to draw the two bracket members in clamping relation with the bars B and D and which will have a tendency to check the expansion of the springs A and thereby avoid breakage of the same.

By the provision of a shock absorbing device embodying the features of our invention, it will be noted that a simple and efficient device is afforded which may be easily and quickly applied to the ordinary springs on automobiles and vehicles of various kinds and affording means whereby, when the springs are depressed, they will move without interference but, on second return movement of the springs, after passing over an obstruction, the movement of the springs is checked, thereby preventing the breaking of the same.

What we claim to be new is:—

A shock absorber for vehicles comprising two angle bars designed to be attached to the upper and lower of a pair of elliptical springs with the shank portions thereof in contact with each other, a bracket member projecting from the face of one of said bars, plates pivotally connected to said bracket member, a clamping shoe, a pin passing through said shoe and having heads countersunk in holes in said plates, headed lugs projecting one from the face of each plate beyond the pivotal connection of the shoe, a pin projecting from one of said angle bars which is clamped to the elliptical spring, and coiled springs connecting the projecting end of the pin upon said angle bar and said headed lugs, as set forth.

In testimony whereof we hereunto affix our signatures in presence of two witnesses.

CHARLES HOWARD VAN WERT.
GEORGE BASTON VAN WERT.

Witnesses:
JACOB A. HUMMEL,
FREDERICK W. DIEHL, Jr.

Copies of this patent may be obtained for five cents each, by addressing the "Commissioner of Patents, Washington, D. C."